Jan. 3, 1967  E. D. PATTERSON  3,295,697
LOCK LEVER SUSPENSION FILE SUPPORT
Filed Dec. 22, 1964
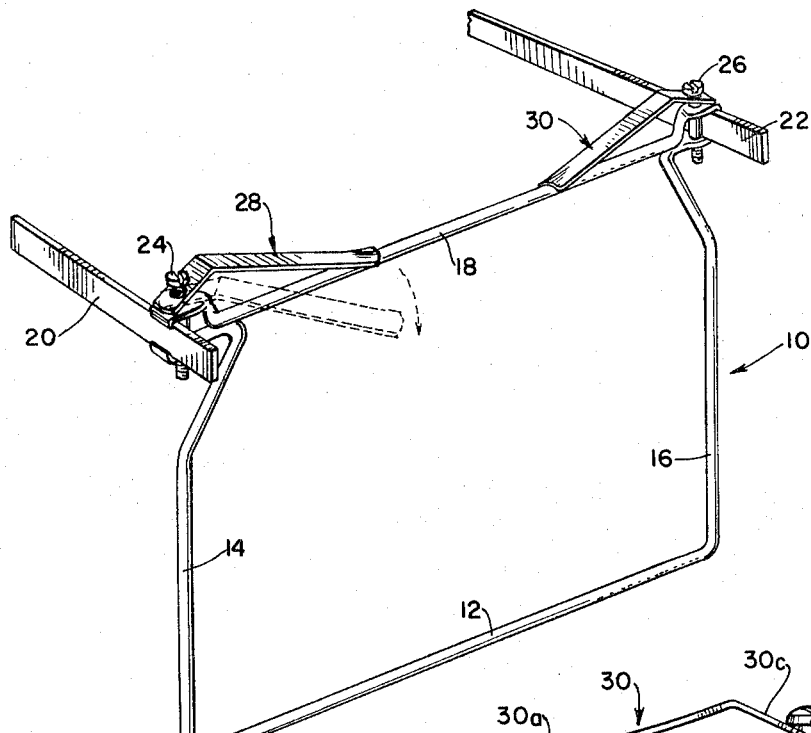
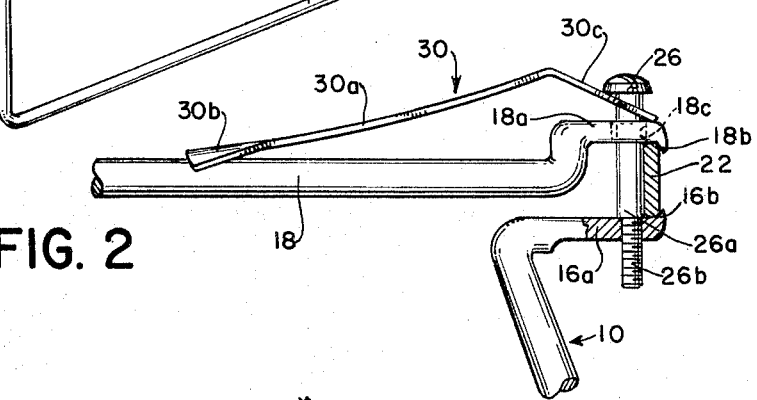
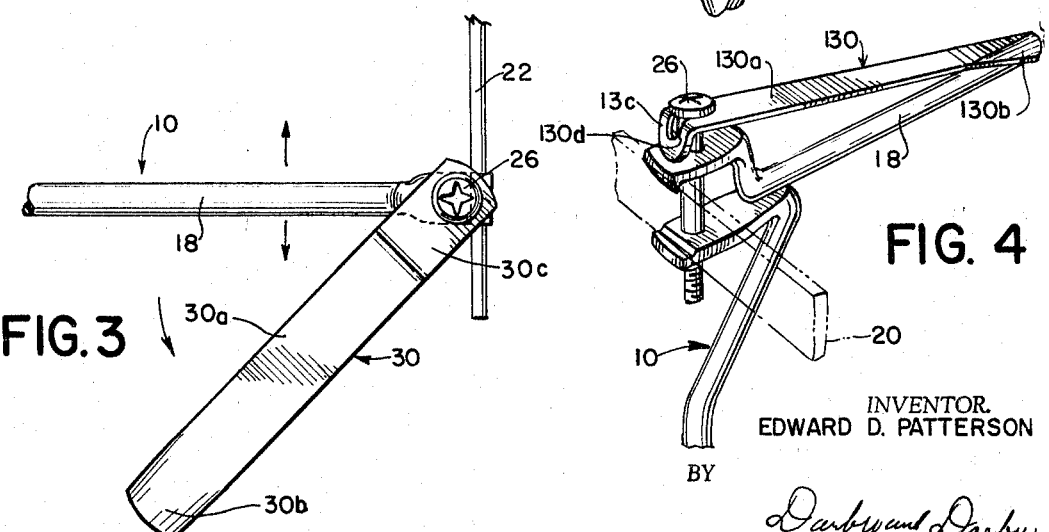
INVENTOR.
EDWARD D. PATTERSON
BY
*Darby and Darby*
ATTORNEYS

United States Patent Office 3,295,697
Patented Jan. 3, 1967

3,295,697
LOCK LEVER SUSPENSION FILE SUPPORT
Edward D. Patterson, Sea Cliff, N.Y., assignor to Oxford Filing Supply Co. Inc., Garden City, N.Y., a corporation of New York
Filed Dec. 22, 1964, Ser. No. 420,275
4 Claims. (Cl. 211—184)

This invention relates to improvements in supporting frames such as are used to hold suspension filing folders.

One object of the invention is to provide an easily assembled combination of simple parts which may be packaged and transported in knocked-down condition and easily assembled at the point of use without tools in one case, or with a small screw driver in another case.

A more specific object of the invention is to provide a strong, rigid framework of this type consisting of two multipart end supports arranged to be connected to a pair of suspension rails by means of a built-in spring leverage system forming part of the end supports so constructed as to insure a very tight interconnection between the parts.

Another object of this invention is to provide a combination thus described wherein the rails could be connected to the end supports by means of screws when the spring lever arrangement is not desired.

Other and more detailed objects of the invention will be apparent from the following disclosure of the single embodiment of the invention illustrated in the attached drawings.

In the drawings,

FIGURE 1 is a perspective view of one end of a suspension file support in accordance with this invention, this end being a duplicate of the other end, not shown;

FIGURE 2 is an enlarged front elevational view of one corner of the assembly of FIG. 1, showing the suspension rail in cross-section and a part of the support frame broken away;

FIGURE 3 is a top plan view of the structure shown in FIG. 2, and

FIGURE 4 shows a modified form of clamping lever.

Supporting frameworks of the type to which this invention relates are widely used for holding a plurality of file folders provided at their upper edges with suspension bars having hooked ends which ride on the rails of the framework.

One form of such framework widely distributed in commerce at the present time consists of a pair of end supports of the form illustrated generally at 10 in the drawings. This support is duplicated for both ends of the framework and is provided with clamping formations at the upper corners by means of which the supports can be secured to a pair of rails at various points therealong. When the rails are seated in the clamping formation and the screws are drawn up tight the pair of end frames and the pair of rails are locked into a rigid assembly and are used to support a plurality of suspension filing folders. In this arrangement it is necessary that the users have available a screwdriver by means of which the clamping screws can be drawn up to tightly lock the suspension rails in the clamping formations. For some users and some fields of use it is desirable to avoid the requirements of using a screwdriver for this purpose.

In accordance with this invention it is proposed to provide an effective, very strong spring arm locking arrangement by means of which the suspension rails can be connected to the end frames without the use of tools. At the same time, from the manufacturers' viewpoint it is desirable that this new construction, which is the subject matter of this disclosure, be of such construction that substantially all of the parts are useful both with and without the spring lever arrangements for locking the parts together.

A general arrangement similar to that herein disclosed is known in this art but the construction thereof is so special that it cannot be interchanged in the manner set forth above. Furthermore, the arrangement of parts is such that due to wear the locking effect is quickly lost, resulting in a loose connection between the end supports and the suspension rails. This is an important practical aspect which cannot be neglected if a successful commercial product is desired.

In the form of the general structure herein disclosed the complete framework includes a pair of end supports 10. As illustrated each of these two supports is constructed of a metal strip of circular cross-section which is bent up into a generally U-shaped formation consisting of a horizontal base 12 and a pair of upstanding legs 14 and 16. As in the case of leg 16, see FIG. 2, the upper terminal end is bent into horizontal position, as shown at 16a and is provided at its upper end edge with a small upstanding lip 16b.

Bridging the open end of the U-frame 10 is a horizontal bar 18 likewise formed of a wire terminating at each end, as in the case illustrated in FIG. 2, with an offset terminal portion 18a which terminates at its lower end edge in a lip 18b. The offset ends 16a and 18a form a clamping structure providing an accurately defined seat by reason of the use of a clamping screw 26 of the form and in the position shown in FIG. 2. The clamping screw has a smooth cylindrical section 26a and an integral threaded extension 26b of reduced diameter to form a shoulder. The space between the shoulder and the end face of the head of the screw is of a predetermined length in relation to the width of the suspension rod 22. The axis of the screw 26 is positioned inwardly of the lips 16b and 18b in relation to the thickness of the suspension rod 22, so that when pressure is applied to the extensions 16a and 16b the suspension rod 22 will be forced in tightly against the cylindrical shank 26a of the screw. It is preferable that the longitudinal edges of the suspension rod 22 be rounded so that the curved opposed faces of the lips 16b and 18b will tend to cam the suspension bar in tightly against the cylindrical shank 26a of the screw 26.

As is clear from FIG. 2 the cylindrical shank 26a extends above the upper face of the extension 18a to provide a limited space in which the short end 30c of a spring lever 30 through which the screw 26 passes. The longer arm 30a of the spring lever 30 extends to a terminal end 30b which is transversely curved to cause a retaining engagement of the lever with the top of the bar 18.

The spring lever 30 is preferably made of spring metal such as tempered steel and is given a permanent bend so as to form the section 30a of greater length than the section 30c to increase the spring lever clamping action. The lever fulcrums at the terminal end of the section 30c on the top face of the extension 18a, as illustrated in FIG. 2. On the other side of the assembly, as shown at FIG. 1, the corresponding suspension rod 20 is similarly clamped by means of the spring lever 28 and its cooperation with the screw 24. The spring levers 30 and 38 are of the same construction as are the screws 24 and 26.

It is of course understood that a frame assembly similar to the assembly 10 of FIG. 1 is to be used at the other end of the suspension rods 20 and 22.

In commerce all of the components comprising the complete frame assembly may be shaped as individual pieces. However, the end frames 10 can be made as sub-assemblies which would comprise the U-shaped component 12–14–16, the closure component 18 for the frame, the screws 24–26 and the spring clamping levers 28–30. In this subassembly the screws 24–26 are driven up tight against the shoulder between the portion 26a and 26b, as shown in FIG. 2.

Attention is called to the fact that the screws 24–26 have a free fit in the terminal end 18a at the hole 18c in the case of the screw 26. Likewise the hole in the end 30c of the lever 30 is enlarged as shown to permit free play of the spring lever on the screw. The same arrangement is true for the lever 28 and the corresponding levers for the other end frame, not shown.

At the place of use the sub-assemblies 10 are slipped onto the suspension rods 20 and 22, ample space being provided by a sliding component 18 upwardly on the screw 26. When the end frame is at the desired longitudinal position on the rods the spring levers are swung up to the position shown in FIGS. 1 and 2, applying a very strong clamping force through the free end of the portion 30c of the lever 30, for example, on the top face of the end 18a of the bar 18. The spring lever 30 provides an extremely firm clamping action on the rod 22. This clamping action is further contributed to by the fact that the spacing between the lips 16b and 18b and the fixed screw 26 in relation to the thickness of the rod 22 is such that the rod is confined laterally of its length under considerable pressure. The rod is in effect cammed towards the screw by the curved surfaces of the lips 16b and 18b.

With this construction it is possible to remove and replace the end frame assemblies 10 on the rods any number of times. It is of course apparent that the end frames can be positioned in various spacings on the rods 20 and 22.

For the sake of clarity it is noted again that the construction shown in FIGS. 2 and 3 is duplicated at each of the four corners of the complete file support.

It is noted that the free ends 30b of the spring levers are transversely curved in the case of the component 18 of circular cross-section so as to cause the frictional engagement therebetween and to cause a centering or detent coaction therebetween. These ends 30b could have other shapes, depending upon the cross-sectional shape of the component 18.

The structure of the modification of FIG. 4 is the same as that of FIGS. 1, 2 and 3 except that the clamping lever has a different form. This lever 130 is provided as before with the curved end 130b to position on the frame member 18. However, the lever is bent near its other end to form the short section 130c with a rounded end as shown. The aperture 130d is elongated so that the levers can swing free when released. The rounding of the end edge of the section 130c provides for smooth camming action when moving the lever into clamped position. The short section 103c insures a very firm clamping action which is magnified when the springy longer section 130a is forced into clamping position.

It will be apparent to those skilled in the art that the details of this invention are subject to some variation without departure from the novel subject matter herein.

For example, where it is not desired to make the structures as shown interchangeable with assemblies in which the spring levers are omitted, the partially threaded screws are replaced with fully threaded screws. It is also apparent that screws of the form shown in the drawings could be replaced by pins which would be riveted into the extensions 16a. In this event the structure shown would not be interchangeable with the regular form of structure previously mentioned wherein the spring levers are not used. It is desired therefore to be limited by the appended claims rather than the particular disclosures selected for illustrative purposes.

What is claimed is:

1. A file support comprising a pair of end frames each including a U-shaped component having a seat forming portion extending outwardly and parallel to the base of the U at the free end of each leg, a superposed component extending across the open end of said U-shaped component having seat forming terminal ends, a headed component secured in said portions and passing freely through said seat forming terminal ends, spring levers permanently pivotally mounted near their ends on said headed components respectively, and a pair of rods clamped between the associated pairs of seat forming portions and seat forming terminal ends when the free ends of said spring levers rest on the associated superposed components.

2. In the combination of claim 1, said spring levers being complementarily shaped with respect to said superposed components so as to resist displacement from clamping position.

3. In the combination of claim 1, said headed components comprising shouldered screws threadedly mounted in said portions.

4. In the combination of claim 1, the opposed terminal edges of said extension portions and seat forming terminal ends being shaped to press said rods against said headed components when the parts are in clamping position.

References Cited by the Examiner

UNITED STATES PATENTS

| | | | |
|---|---|---|---|
| 2,087,217 | 7/1937 | Cohen | 248—226 |
| 2,783,963 | 3/1957 | Kalberg | 248—361 |
| 2,852,028 | 9/1958 | Patterson et al. | 129—16 |
| 2,871,861 | 2/1959 | Posner | 129—16 |

CLAUDE A. LE ROY, *Primary Examiner.*

R. P. SEITTER, *Assistant Examiner.*